Figure 1:
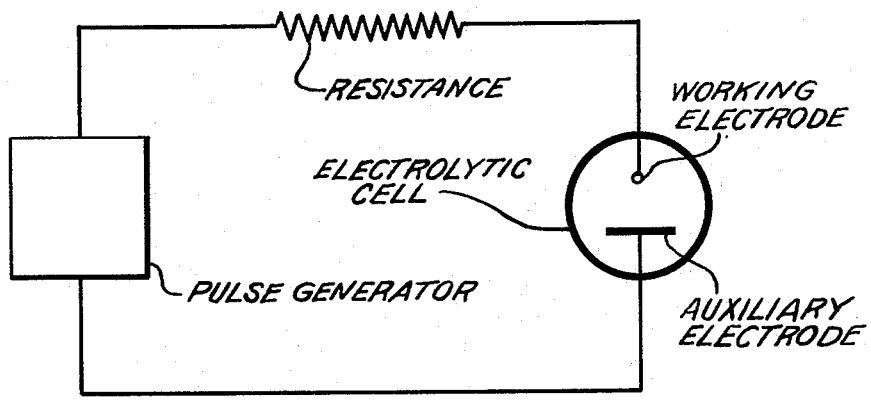

Oct. 4, 1966  A. L. JULIARD  3,276,976

METHOD OF MAKING A FUEL CELL ELECTRODE

Filed Feb. 13, 1962

INVENTOR.
Andre' L. Juliard
BY
William Klabunde
ATTORNEY.

United States Patent Office 3,276,976
Patented Oct. 4, 1966

3,276,976
METHOD OF MAKING A FUEL CELL
ELECTRODE
André L. Juliard, Haverford Township, Delaware County, Pa., assignor to Air Products and Chemicals, Inc., Philadelphia, Pa., a corporation of Delaware, and Northern Natural Gas Company, Omaha, Nebr., a corporation of Delaware
Filed Feb. 13, 1962, Ser. No. 172,954
8 Claims. (Cl. 204—43)

This invention relates to a fuel cell electrode and a method for making the same, and is particularly directed to the type of electrode which comprises a body or support of desired electrode shape composed of electroconductive base material, to which is applied a deposit of metallic material having catalytic properties capable of promoting the desired electrode reaction.

Metals of the platinum and noble metal groups have been found to possess, in varying degrees, desirable catalytic properties for promoting electrochemical reactions in fuel cells. In any specific application, however, the selection of the catalytic material, as well as of the base material is made with particular regard to the particular oxidant and reductant materials to be charged to the fuel cell and to the nature of the electrolytic material, that is, whether basic or acidic. In any case, the materials brought together in carrying out the electrochemical reactions must be compatible in order to avoid early deterioration of the electrodes.

Various methods for applying metallic catalyst to mineral or carbonaceous base material are known, such as by the application to a base material of compounds containing the desired metal component and the subsequent decomposition of such compounds to leave a surface coating of the free metal; or by electroplating a mineral or carbonaceous base material with metallic material having the desired catalytic properties. It is with the latter type of electrode and manner of catalyst application that the invention is primarily concerned.

Plated electrodes have been prepared by standard electroplating techniques involving relatively low voltages and relatively low current densities, such as considerably less than one amp./cm.$^2$. Such electroplating methods generally produce a relatively bright, smooth or black deposit of the plating metal upon the surface of the base material. While electrodes thus coated have exhibited a certain amount of catalytic activity for fuel cell use, the results on the whole have not been outstandingly good.

Experimental investigation of the electroplating technique as applied to electrode formation has disclosed that when metals of the platinum and noble metal groups are pulse electroplated at high overvoltage, and consequently at high current densities, in excess of those employed in standard electroplating operations, an entirely different type or form of metallic deposit is obtained; the deposit being characterized by extremely high surface area resulting in markedly improved catalytic activity.

It is well known, however, that the catalytic activity of some materials may be appreciably promoted by intimate contact with certain other materials. As applied to the particular catalytic materials under consideration, for example, certain metals of the noble metal groups of Groups IB and VIII of the Periodic Table of the Elements have been found to promote in varying degrees the activity of platinum, provided that the atoms of both the promoter metal and the platinum are intimately admixed, as by co-plating of a selected catalytic metal and is promoter metal upon the base material.

In accordance with the invention a fuel cell electrode of improved activity is obtained by a pulse-plating technique wherein the desired metal or combination of metals selected as the catalyst or as catalyst and promoter, respectively, are electrodeposited upon an electroconductive base electrode or support by means of a high voltage, low frequency, pulsating current. The selection of the base material as well as the catalytic and promoter materials will depend upon the type of system, acidic or basic, in which the electrode is to be employed, since it is essential that the electrode materials be compatible with the electrolyte.

The base material, for example, may comprise mineral, carbonaceous or other electroconductive materials, such as boron carbide, silicon carbide and other compounds.

The catalytic material and promoter, if any, are supplied initially in the form of metallic salts which are utilized in predetermined and controlled amounts or proportions to provide a desired plating solution. The plating solution is placed in an electrolytic cell in contact with a working electrode formed of the selected base material and an auxiliary platinum electrode which may be of any suitable shape, such as a crucible, plate, foil, or screen. Preferably, the surface area of the auxiliary electrode is at least as large as or larger than the surface area of the working electrode, and is placed in such positional relationship with respect to the working electrode as to produce the optimum plating effect in accordance with known electroplating practices.

A low frequency, pulsating electric current at high current density is applied for several minutes to the electrolytic cell so as to form a deposit of the catalytic metal or metals upon the working electrode. The activity of the resultant electrode having a bimetallic deposit or plating of catalytic material and promoter will vary with the relative concentration of the two metals in the plating solution. Maximum activity is generally achieved when the two metals are at or near equimolar concentration, such as between 1:2 and 2:1.

In a preferred embodiment of the method of the invention the electrolytic cell is subjected to pulsating electric current at a current density of about 1–6 amps./cm.$^2$. The current is supplied at a frequency of about 30 cycles/sec. and the pulse duration is about 0.1–2.0 milliseconds. The electrolysis treatment is continued for a short period, such as about 0.2–5.0 minutes.

While the method of the invention is capable of being carried out by the co-deposition of any combination of the platinum group and noble metals desired, the particular selection of the plating materials will depend upon various factors, such as, the nature of the base material, the electrolyte and the oxidant and reductant materials to be used in the contemplated fuel cell. It is contemplated that each system may have its own special requirements and optimum combination of base and plating materials. Experimental investigation has shown particularly outstanding activity for ruthenium as a promoter of platinum in the electrooxidation of methanol. Rhodium also exhibited good, but lesser, activity as a promoter, as did also gold.

Figure 2:
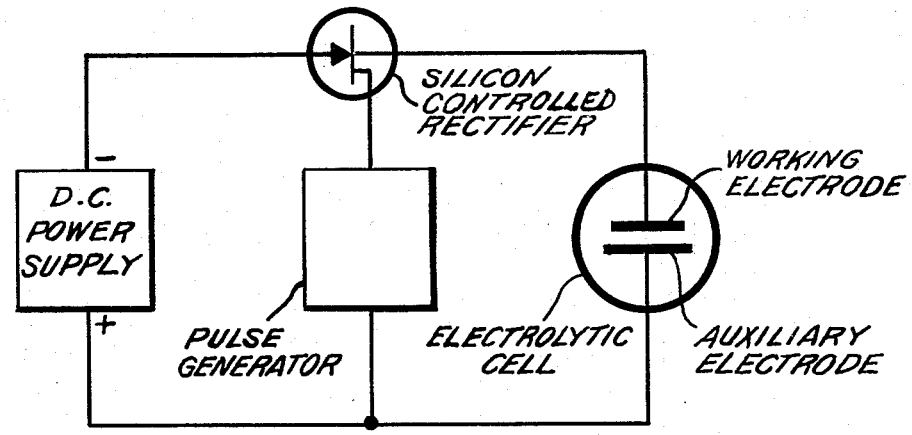

For a fuller understanding of the invention, reference may be had to the following specification and claims taken in connection with the accompanying drawing, forming a part of this application, in which:

FIG. 1 diagrammatically illustrates a system for pulse electroplating a small surface electrode in accordance with the invention; and FIG. 2 diagrammatically illustrates an alternative system, particularly suited for the pulse electroplating of relatively large electrode surfaces.

In the system of FIG. 1 there are connected in closed circuit, and illustrated in clockwise order, a high power output pulse generator, which may be a pulse generator of commercial type or any other arrangement of known apparatus adapted to produce the desired pulse, a resistance of preselected magnitude adapted to control the flow of current through the electrode to be plated, for convenience designated the working electrode, and an electrolytic cell, all elements being identified by suitable legends.

The electrolytic cell may be of standard type comprising a receptacle adapted to contain a body of liquid plating solution and having means for supporting at suitably spaced locations within the plating solution both the working electrode and an auxiliary electrode which receive the pulsating voltage.

The power output and the selected resistance are such as to produce an overvoltage of the working electrode in the order of about 1–15 v., so that the current density in the circuit will be in the range of about 1–6 amps./cm.$^2$.

In the system of FIG. 2 there is shown an electrical circuit containing a direct current power supply, using a silicon controller rectifier as a current gate for a polarization power supply. In this modification the resistance is unnecessary since the voltage applied to the cell can be controlled by the D.C. power supply.

The auxiliary or counter electrode is preferably large in comparison with the working electrode and comprises a non-corrodible body, preferably a platinum body, which may, for example, be in the form of a crucible, plate, foil, or screen. Other materials suitable for the auxiliary electrode may comprise carbon, silicon carbide and the like; however, these materials are not necessarily of equal effectiveness with platinum. The working electrode may be in any practicable form desired in the preliminary or final shaping of the fuel cell electrode.

An experimental investigation was carried out in order to determine the activity improvement obtainable by coplating platinum and promoter metals from the platinum and noble metal groups by the pulse-plating technique of the invention.

*Experiment 1*

For comparison purposes, first, platinum alone was pulse plated upon a platinum wire electrode of 4 mm.$^2$ area; then, platinum and each of the other metals of the platinum group as a promoter, successively, were coplated upon individual base electrodes of the same type. In each case, the pulse plating was carried out at a frequency of 30 cycles/sec. and at a current density of 6 amps./cm.$^2$. The pulse duration was 0.60 millisecond and the total plating time was 3 minutes. The pulse plating of platinum on the platinum wire was obtained from a plating solution consisting of 0.050 molar chloroplatinic acid, while the coplating of platinum with the other metals as promoters was obtained from equimolar solutions of chloroplatinic acid and the chloride of the particular promoter metal, each component being present in 0.025 molar concentration.

The pulse-plated wire electrodes were then tested for activity, measured by the current density in ma./cm.$^2$ at 0.65 v. polarization from the theoretical standard potential of methanol. The results are tabulated below:

TABLE 1

| Pulse-plated metal: | Activity (current density in ma./cm.$^2$ at 0.65 v. polarization) |
| --- | --- |
| Platinum alone | 33 |
| Platinum-iridium | 42 |
| Platinum-palladium | 48 |
| Platinum-rhodium | 76 |
| Platinum-ruthenium | 200 |

Black platinum has a current density or activity rating of about 20 ma./cm.$^2$ at 0.65 v., even with appreciably greater amounts of platinum than in the case of the materials in Table 1.

The results of the activity tests clearly revealed the superiority of ruthenium as a promoter for co-plating with platinum by use of the pulse-plating technique.

In order to determine the optimum conditions for platinum-ruthenium pulse plating, further experiments were carried out under varying conditions of total time, pulse duration, and pulse cycle. The plating solution was composed of 0.025 M chloroplatinic acid plus 0.025 M ruthenium trichloride and the pulse plating was carried out at a controlled current density of 6 amps./cm.$^2$. The plated electrodes were then tested for activity at 0.65 v. polarization from theoretical. The results of the tests appear below.

TABLE 2

| Duration of Electrolysis (min.) | Duration of pulse (milliseconds) | Frequency of pulse (c.p.s.) | Activity of Electrode ma./cm.$^2$ |
| --- | --- | --- | --- |
| 3 | 0.1 | 30 | 44 |
| 3 | 0.6 | 30 | 200–212 |
| 3 | 1.8 | 30 | 84 |
| 3 | 0.6 | 10 | 94 |
| 9 | 0.6 | 10 | 163 |

The results of the activity tests reveal a clear superiority for a relatively short plating treatment in the order of about 3 minutes, a short pulse duration of about 0.6 milliseconds and a pulse frequency of 30 cycles per second.

In the practice of the invention it is contemplated that various factors will affect the optimum conditions under which the pulse plating should be carried out, and therefore the invention is not to be limited specifically to the conditions under which the foregoing reported experiments were carried out.

For example, it is contemplated that the pulse duration, although necessarily short, may be in the range of 0.1–1.0 millisecond; the frequency of pulsation may be in the range of about 10–200 c.p.s.; and the total time of treatment may be in the neighborhood of several minutes.

Obviously many modifications and variations of the invention as hereinbefore set forth may be made without departing from the spirit and scope thereof, and therefore only such limitations should be imposed as are indicated in the appended claims.

What is claimed is:

1. The method of forming a fuel cell electrode which comprises the steps of: supporting an electroconductive base member, as a cathodic electrode to be plated, and a body of platinum, as an anodic plating electrode, in spaced relationship within an electrolytic plating solution compatible with said electrodes and containing a platinum salt, and imposing upon said electrodes for a total period of 0.2–5.0 minutes a pulsating electric current characterized by
   (a) discontinuous current flow,
   (b) a frequency in the range of 10–200 cycles/second,
   (c) a pulse duration of 0.1–2.0 milliseconds,
   (d) an overvoltage of 1–15 volts at the cathode,
   (e) and a current density of 1–6 amps/cm.$^2$.

2. The method as in claim 1 in which said electrolytic plating solution comprises also a salt of a promoter metal selected from the group consisting of the noble metals of Groups IB and VIII of the Periodic Table of the Elements.

3. The method as in claim 2 in which said salts of platinum and said promoter metal are in a concentration ratio of between 1:2 and 2:1 molar.

4. The method as in claim 2 in which said promoter metal is ruthenium.

5. The method as in claim 3 in which said electrolytic plating solution comprises a mixture of chloroplatinic acid and ruthenium chloride.

6. The method as in claim 5 in which said chloroplatinic acid and said ruthenium chloride are present in said electrolytic solution in substantially equimolar amounts.

7. The method as in claim 2 in which said promoter metal is gold.

8. The method as in claim 6, in which said plating solution comprises 0.025 M amounts of both chloroplatinic acid and ruthenium trichloride, said total period for imposing pulsating electric current upon said electrodes is about 3 minutes, and said electric current is characterized by
(a) a frequency of about 30 cycles/second,
(b) a pulse duration of about 0.6 millisecond, and
(c) a current density of about 6 amps/cm.$^2$.

References Cited by the Examiner

UNITED STATES PATENTS

| | | | |
|---|---|---|---|
| 1,907,710 | 5/1933 | Bass | 204—47 X |
| 1,949,131 | 2/1934 | Shields | 204—47 |
| 2,079,840 | 5/1937 | Byrkit | 204—46 |
| 2,443,599 | 6/1948 | Chester | 204—52 |
| 2,451,340 | 10/1948 | Jernstedt | 204—47 |
| 2,453,668 | 11/1948 | Marisic et al. | 204—49 |
| 2,497,110 | 2/1950 | Williams | 204—47 |
| 2,720,494 | 10/1955 | Suter et al. | 204—47 |
| 2,726,202 | 12/1955 | Rockafellow | 204—50 |
| 2,847,372 | 8/1958 | Dijksterhuis et al. | 204—47 |
| 2,852,447 | 9/1958 | Hausner | 204—10 |
| 3,098,762 | 7/1963 | Roblee et al. | 117—228 |

JOHN H. MACK, *Primary Examiner.*

MURRAY TILLMAN, *Examiner.*

G. KAPLAN, *Assistant Examiner.*